Oct. 29, 1929.                S. G. DOWN                 1,733,186
                        AUTOMOTIVE BRAKE DEVICE
                          Filed Aug. 19, 1926
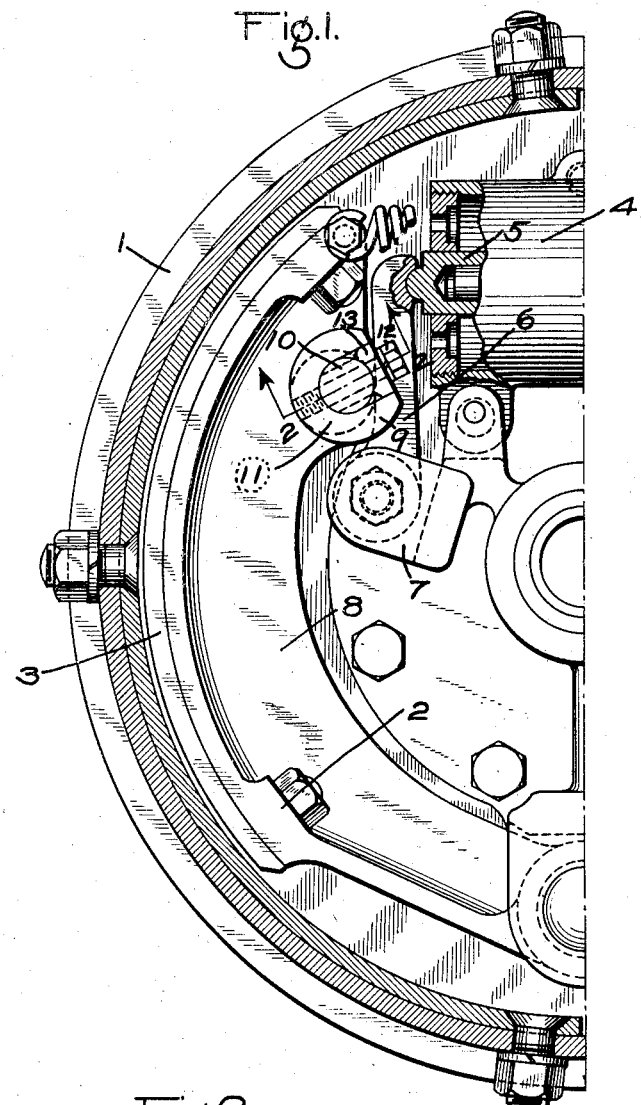
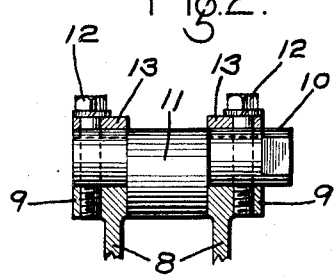
INVENTOR
SIDNEY G. DOWN
BY *Wm. M. Cady*
ATTORNEY Patented Oct. 29, 1929

1,733,186

UNITED STATES PATENT OFFICE

SIDNEY G. DOWN, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA

AUTOMOTIVE BRAKE DEVICE

Application filed August 19, 1926. Serial No. 130,213.

This invention relates to vehicle brakes and more particularly to means for taking up slack due to the wear of the brake shoes.

The principal object of my invention is to provide an improved slack adjuster of the above type.

In the accompanying drawing; Fig. 1 is a sectional view of one-half of a vehicle brake construction, showing my improved slack-adjuster applied thereto; and Fig. 2 a section on the line 2—2 of Fig. 1.

In Fig. 1, one-half of a vehicle brake construction is shown, comprising a brake drum 1 having an internal friction face and having mounted therein pivotally connected brake heads 2, each brake head having a brake shoe 3 adapted to frictionally engage the internal friction face of the drum 1.

Also mounted in the brake drum is a cylinder 4 containing pistons (not shown) for operating piston stems 5. The outer end of each piston stem 5 is rounded and engages in a corresponding socket formed in one end of a lever 6, the other end of the lever being pivotally connected to a bracket 7.

The spaced ribs 8 of the brake head 2 are provided with bosses 9 at opposite sides and said bosses are apertured to receive a shaft 10, the bores being open at one side to permit the shaft to be installed in place.

Centrally, the shaft 10 is provided with an eccentric portion 11 and the ends of the shaft are bored to receive cap screws 12.

The shaft 10 is so positioned, that the eccentric portion 11 engages the lever 6 at a point intermediate its ends, and when the shoes 3 are newly installed, the eccentric portion is positioned with its eccentricity turned away from the lever 6, as shown in the drawing. A clamping member 13 is applied to each screw and the screws are inserted through the openings in the shaft 10 and are screwed down, so that the clamping member 13 grips the shaft.

When the brake shoes have been worn down to a considerable degree, the slack is taken up by removing the screws 12 and then rotating the shaft 10 one-half a turn, so that the eccentricity of the portion 11 is brought into engagement with the lever 6. The screws 12 are then replaced and screwed down and the brakes may then be used with the slack taken up until the shoes are completely used up.

Having now described my invention, what I claim as new and desire to secure by Letters Patent, is:—

1. The combination with a brake drum and a brake head mounted therein, of a cylinder mounted in said drum, a piston rod extending out of said cylinder, a pivoted lever having one end in engagement with said piston rod, and an adjustable cam carried by said brake head and engaging said lever at a point intermediate the pivot connection and the piston rod.

2. The combination with a brake drum and a brake head mounted therein, of a cylinder mounted in said drum, a piston rod extending out of said cylinder, a pivoted lever having one end in engagement with said piston rod, a rotatable member carried by said brake head and having an eccentric portion engaging said lever, a clamping bolt extending through an opening in said member in one position of said member and also adapted to extend through said opening when said member is rotated 180 degrees from said position.

In testimony whereof I have hereunto set my hand.

SIDNEY G. DOWN.